(12) United States Patent
Dattilo

(10) Patent No.: US 9,776,115 B1
(45) Date of Patent: Oct. 3, 2017

(54) MOBILE DEVICE FOR RECOVERY AND ON SITE STORAGE OF USED COOKING OIL

(71) Applicant: Nicholas Wayne Dattilo, Clarksville, TN (US)

(72) Inventor: Nicholas Wayne Dattilo, Clarksville, TN (US)

( * ) Notice: Subject to any disclaimer, the term of this patent is extended or adjusted under 35 U.S.C. 154(b) by 564 days.

(21) Appl. No.: 14/308,423

(22) Filed: Jun. 18, 2014

(51) Int. Cl.
| | | |
|---|---|---|
| B01D 35/00 | (2006.01) | |
| B01D 35/26 | (2006.01) | |
| A47J 37/12 | (2006.01) | |
| B01D 21/30 | (2006.01) | |
| B01D 21/00 | (2006.01) | |

(52) U.S. Cl.
CPC .......... *B01D 35/26* (2013.01); *A47J 37/1271* (2013.01); *A47J 37/1223* (2013.01); *B01D 21/0018* (2013.01); *B01D 21/30* (2013.01)

(58) Field of Classification Search
None
See application file for complete search history.

(56) References Cited

U.S. PATENT DOCUMENTS

| | | | |
|---|---|---|---|
| 4,091,895 A | * | 5/1978 | Lang ...................... F01M 11/12 184/103.1 |
| 4,148,729 A | | 4/1979 | Howard |
| 5,249,511 A | | 10/1993 | Shumate et al. |
| 5,823,097 A | | 10/1998 | Dirck |
| 5,839,360 A | | 11/1998 | Williams |
| 6,330,852 B1 | | 12/2001 | Williams |
| 6,792,983 B2 | | 9/2004 | Allora |
| 7,735,526 B2 | | 6/2010 | Palazzo |
| 8,561,462 B2 | | 10/2013 | Arnold et al. |
| 2002/0046657 A1 | | 4/2002 | Takahashi |
| 2012/0192646 A1 | * | 8/2012 | Arnold ................ G01F 23/0053 73/292 |
| 2013/0193044 A1 | | 8/2013 | Coco |
| 2013/0193084 A1 | | 8/2013 | Vogt |
| 2014/0013840 A1 | | 1/2014 | Arnold et al. |

FOREIGN PATENT DOCUMENTS

EP    2 375 947 B1    10/2011

* cited by examiner

*Primary Examiner* — Richard Gurtowski
(74) *Attorney, Agent, or Firm* — Waller Lansden Dortch & Davis, LLP; Nathan J. Bailey; Blake M. Bernard

(57) ABSTRACT

A mobile machine for recovery and on site storage of used cooking oil with reservoir, detachable pump, oil reservoir, wand, wand filter, casters, hoses, fittings, withdrawal port, and oil level determination means.

18 Claims, 12 Drawing Sheets

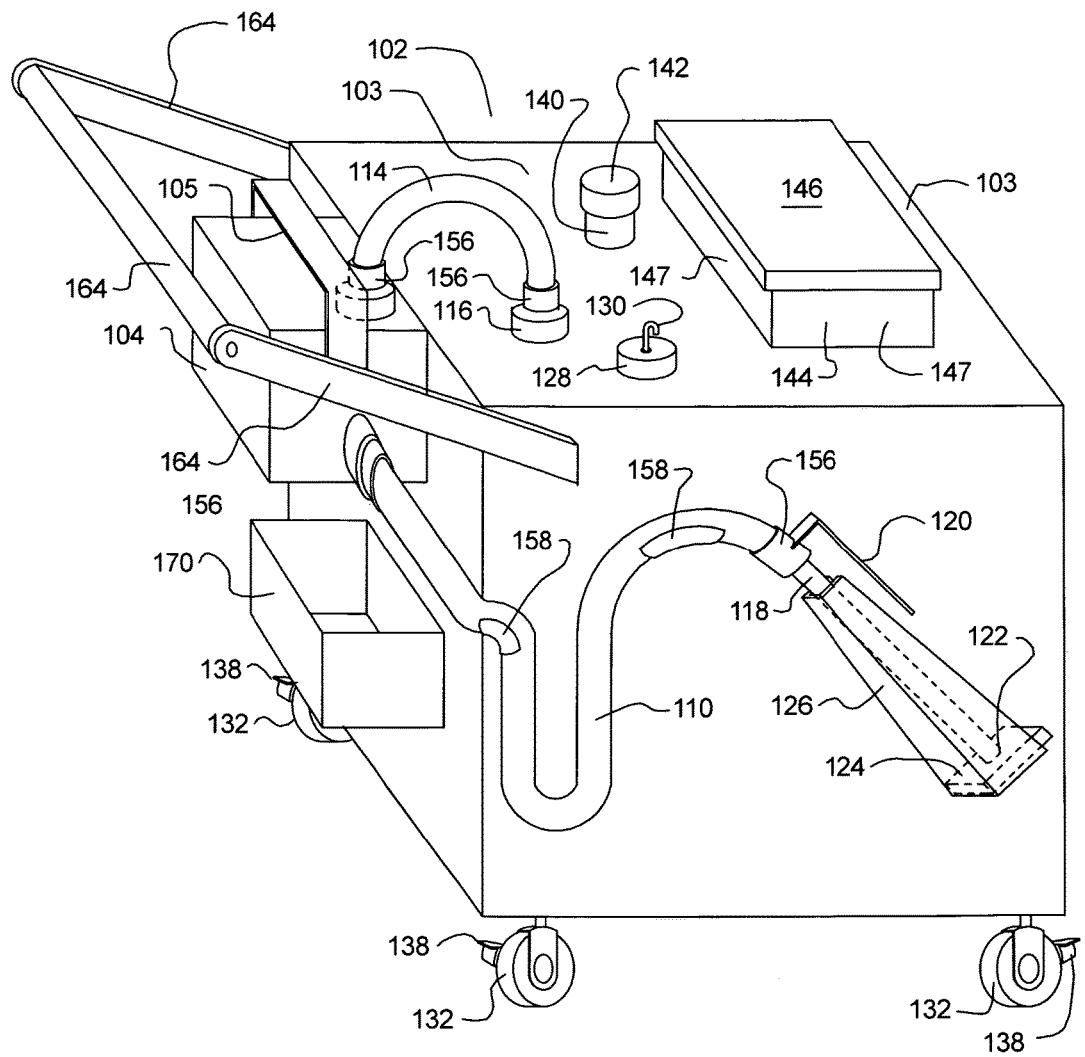
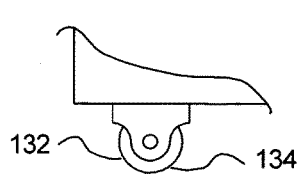
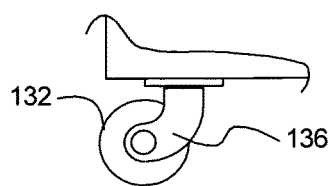
Fig. 1
Fig. 2
Fig. 2A

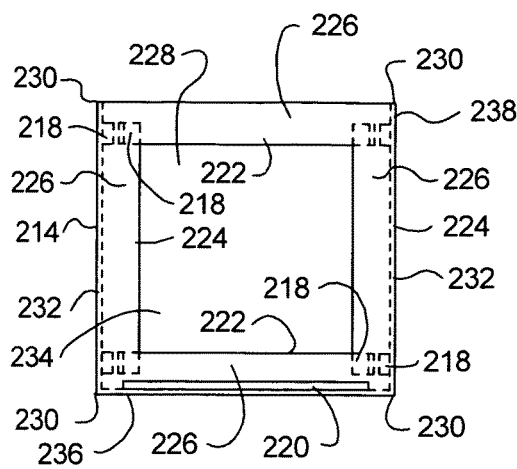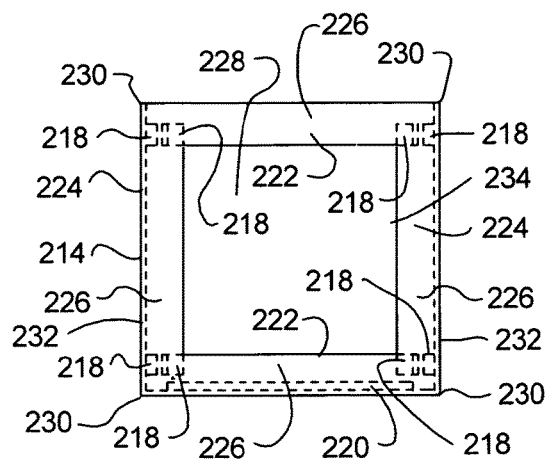
Fig. 9   Fig. 9A
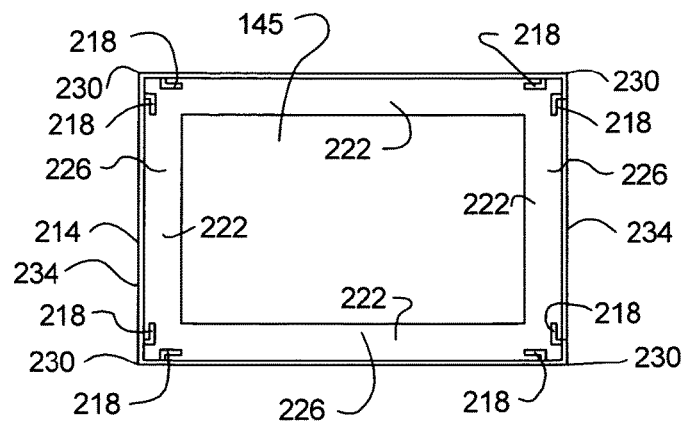
Fig. 9B
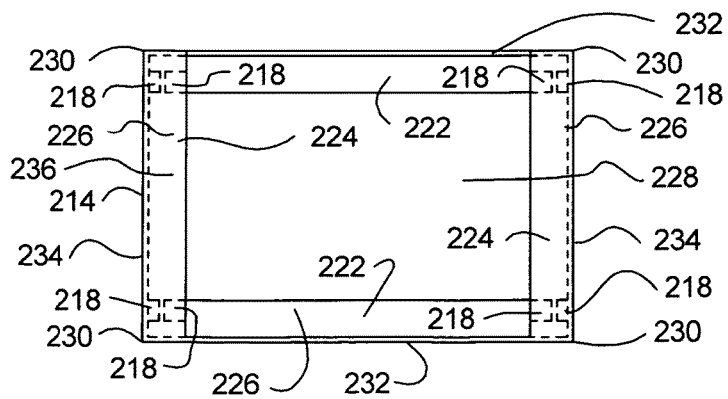
Fig. 9C

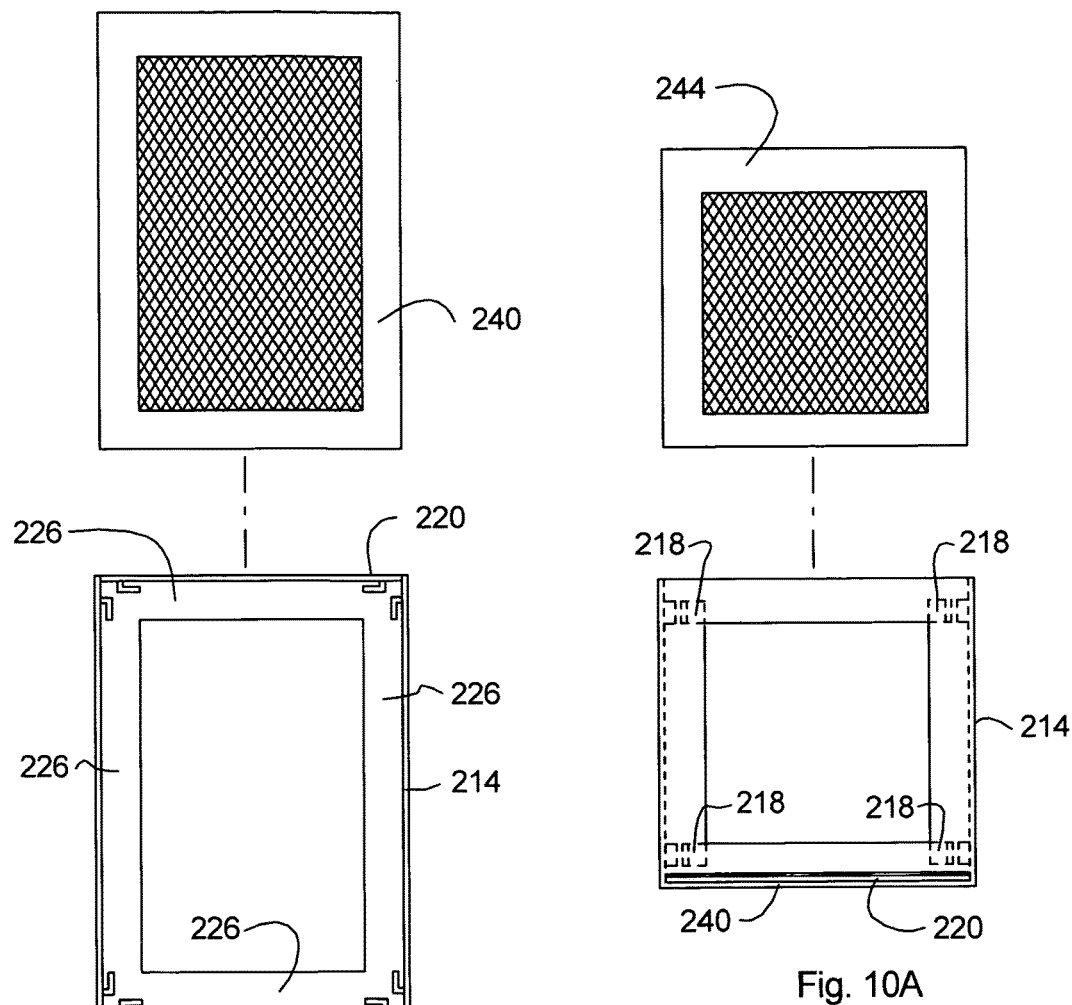
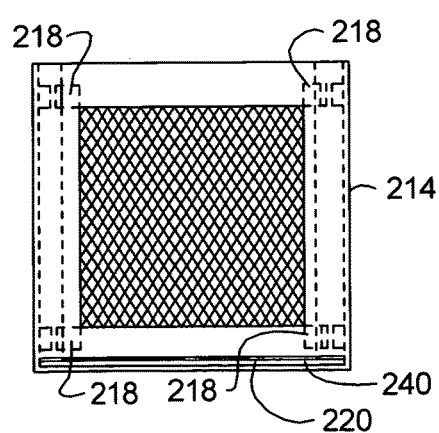
Fig. 10  Fig. 10A
Fig. 11  Fig. 11A

MOBILE DEVICE FOR RECOVERY AND ON SITE STORAGE OF USED COOKING OIL

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of resource recycling and more specifically to a mobile device for recovery and on site storage of used cooking oil. There are numerous business establishments, in example restaurants, hospitals, assisted living facilities, schools, nursing homes, which must provide preparation and serving of food. Such institutions invariably make use of deep fat fryers to satisfy the demands of their customers for particular types of food.

Deep fat fryers utilize cooking oil which is heated in vats ranging in size from a few cups to hundreds of gallons. Such fryers are very effective but their usage does give occasion to serious inconveniences. In example, the cooking oil quality in the fryers must be constantly monitored and when it is no longer usable, must be removed, replaced, and disposed of. Typically, when a fryer is to be emptied, the cooking oil must be allowed to cool down from its maximum temperature, usually approximately 350° F., to a temperature that would not be harmful to one performing the removal task. In the case of larger fryers, this cooling can take up to twelve hours, during which time the fryer is out of service. Most fryers comprise means to remove spent cooking oil such as drains or pumps which pump cooking oil out of the vats through conduits and into a vessel. Said vessel is then carried to a storage bin, generally located outside the building housing the facility, and deposited therein. The process typically requires actions on the part of the employee performing the cooking oil removal and transfer to storage bin task which expose him to possible and very probable contact with the cooking oil. In example, the cooking oil may splash, the cooking oil draining out of a fryer may fall on the employee, the employee may accidentally misdirect a stream of cooking oil pumped out of a fryer through a hose so that it falls on himself or someone else. Further, the external location of the storage bin requires the employee to exit the building which he will invariably take advantage of to loiter.

Then, once the cooking oil is removed from the fryer vat, any residue of cooking oil and/or organic remnants remaining in the bottom of said vat must be removed. If the vat is not sufficiently cleaned of such dregs, the new replacement cooking oil may be contaminated resulting in poor food quality and reduced life span of the cooking oil. Such residue will also cause uneven heating of the cooking oil and resultant improper cooking.

The whole process, accomplished with extant technology, tends to be very messy and facets of it such as cleaning out residue can be difficult. Also, the external storage bins tend to be very unsanitary and unsightly as cooking oil deposited therein tends to be spilt.

Now that modern technological advances have rendered used cooking oil a valuable commodity as a base for fuel for internal combustion engines, sale of used cooking oil can be of significant financial benefit to fat fryer operators. It is therefore to their advantage to store used cooking oil and efficiently transfer the cooking oil to a buyer who generally transfers the cooking oil to a tank truck.

The instant art provides a means to safely remove cooking oil from a fryer without having to wait for the cooking oil to cool, provides a means of storage which is movable from the collection point at the fryer to an out of the way place within a building and is movable outside the building to a disposal tank truck. This removal of the storage device can be performed by the driver of the truck so that employees are free for other tasks.

The instant art also provides means to store and readily access implements to remove dregs from the vat, such implements as vacuum cleaner, cleansing pads, power polishers, brushes, gloves, etc.

BRIEF SUMMARY OF THE INVENTION

The primary object of the invention is to increase employee safety.

Another object of the invention is to provide used cooking oil disposal.

Another object of the invention is to provide used cooking oil sanitary storage.

A further object of the invention is to provide a cooking oil collection and storage device that is movable within a work space.

Yet another object of the invention is to provide a cooking oil collection and storage device that is customizable to fit in any particular space within a work environment.

Another object of the invention is to provide means to clean residue out of fryers eliminating black carbon deposits and/or boil outs.

Another object of the invention is to eliminate need for used cooking oil bins outside premesis.

A further object of the invention is to eliminate the need for employees to exit premesis to transport used cooking oil to an outside storage bin.

Yet another object of the invention is reduce time employees must deal with used cooking oil thusly freeing them for other tasks and increasing efficiency.

Still yet another object of the invention is to improve food quality by improving cooking oil quality.

Another object of the invention is to extend life of fryer by properly maintaining fryer so that it heats evenly.

Another object of the invention is to accrue ecological benefits.

A further object of the invention is to provide a device configurable to fit in out-of the-way spaces when not in use.

Yet another object of the invention is to eliminate the need to allow cooking oil to cool before removal thusly increasing fryer up time.

Still another objet of the invention is to provide a path from cooking oil uptake point to cooking oil storage point that is as unimpeded as possible by devices, in example valves, that may be adversely affected by cooking oil buildup and which may increase energy necessary to transfer cooking oil through said path.

Yet another object of the invention is to provide a device that need not comprise integral means to remove cooking oil from its storage element.

Still yet another object of the invention is to eliminate any handling of or transfer of cooking oil after it is removed from the fryer until it is picked up by a buyer.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a mobile machine for recovery and on site storage of used cooking oil comprising: reservoir, detachable pump, cooking oil reservoir, intake wand, intake wand filter, casters, hoses, fittings, withdrawal port, and cooking oil level determination means.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a perspective view of the invention.

FIG. 2 is a side view of an element of the invention.

FIG. 2A is a side view of an element of the invention.

FIG. 9 is a front view of elements of the invention.

FIG. 9A is a back view of elements of the invention.

FIG. 9B is a top view of elements of the invention.

FIG. 9C is a side view of elements of the invention FIG. 10 is an exploded top view of elements of the invention.

FIG. 10A is an exploded front view of elements of the invention.

FIG. 11 is a top view of elements seen in FIG. 10 FIG. 11A is a front view of elements shown in FIG. 10A.

LIST OF COMPONENTS

Figure 3:
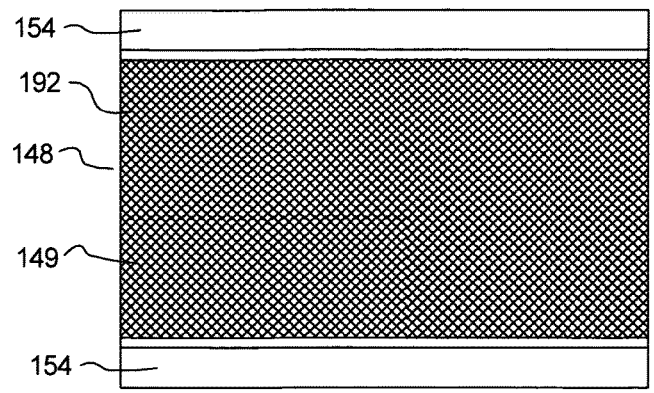
FIG. 3 is a top view of an element of the invention.
Figure 3A:
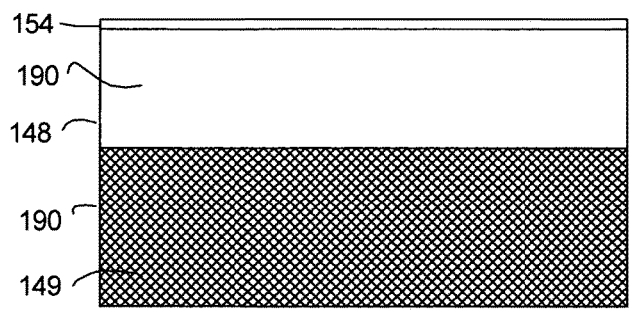
FIG. 3A is a side view of an element of the invention in operative disposition.
Figure 3B:
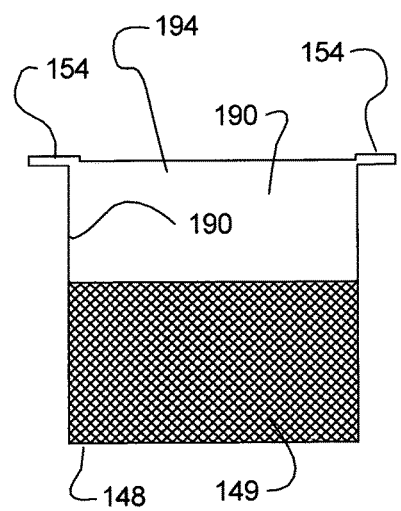
FIG. 3B is front view of an element of the invention.
Figure 3C:
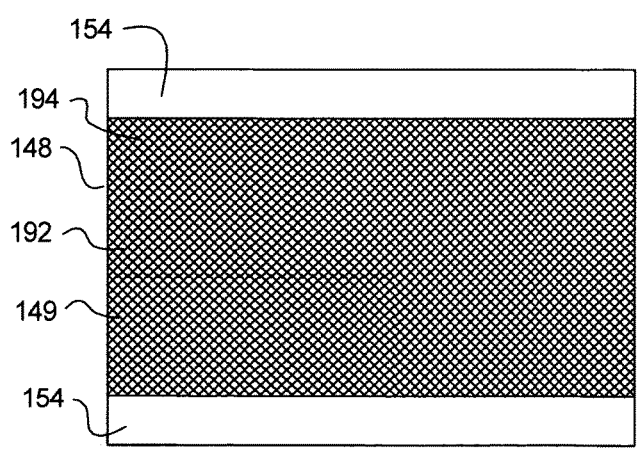
FIG. 3C is a bottom view of an element of the invention

100 Cooking oil recovery and storage device
101 Cooking oil
102 Cooking oil tank
103 Cooking oil tank top
104 Pump housing
105 Pump housing handle
106 Pump
108 Pump inlet conduit
109 Cooking oil tank side
110 Cooking oil extraction conduit
111 Cooking oil tank floor
112 Pump outlet conduit
114 Cooking oil tank fill conduit
116 Cooking oil tank fill port
118 Intake wand
119 Intake wand flange
120 Intake wand handle
122 Intake wand inlet
123 Intake wand inlet cooking oil filter port
124 Intake wand inlet cooking oil filter
125 Intake wand inlet cooking oil filter sieve portion
126 Wand holster
127 Intake wand inlet cooking oil filter stay
128 Cooking oil level determination means
129 Stay clip
130 Dip stick
131 Dip stick graduations
132 Caster
134 Fixed Caster
136 Movable caster
138 Caster locking means
140 Cooking oil withdrawal port
142 Cooking oil withdrawal port cap
144 Cooking oil inlet filter port
145 Aperture
146 Cooking oil inlet filter port cap
147 Cooking oil inlet filter port walls
148 Cooking oil port filter
149 Cooking oil port filter sieve portion
150 Cooking oil port filter frame
152 Cooking oil port filter panel
154 Cooking oil port filter flange
156 Fitting
158 Conduit bracket
160 Pump assembly bracket
162 Tank hook
164 Device push/pull handle
166 Pump inlet
168 Pump outlet
170 Accessory tray
172 Glove
174 Brush
176 Vacuum
178 Vacuum hose 180 Vacuum hose attachment
182 Power polisher
184 Cleaning pads
185 Cleaning compound
186 Intake wand angle
190 Cooking oil port filter wall
192 Cooking oil port filter floor
194 Cooking oil port filter aperture
196 Pump outlet end
198 Pump inlet end
200 Fryer
202 Fryer vats
204 Residue
210 Collection vessel
212 Fryer extraction hose
214 Cooking oil port filter port frame
216 Cooking oil port filter panel
218 Cooking oil port filter brackets
220 Cooking oil port filter frame slot
222 Cross member
224 Upright member
226 Strips
228 Filter aperture
230 Cooking oil port filter frame corner
232 Cooking oil port filter frame side
234 Cooking oil port filter frame end
236 Cooking oil port filter frame bottom
238 Cooking oil port filter frame top
240 Filter bottom panel
242 Filter side panel
244 Filter end panel
246 Filter panel sieve portion
248 Tank evacuation conduit
249 Tank evacuation conduit intake
250 Baffles
252 Tank maintenance access port
254 Tank evacuation cannula
256 Cannula intake

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is well known in myriad arts that devices such as pumps and power tools require power cords, comprise on/off switches, and provide means to fix in inoperative orientation said power cords. The functions and manners of usage of such devices is also well known. Therefore the employment of same will not be described in detail unless necessary to teach the instant art. Also well known are sundry types of fittings and/or couplings which removably attach one conduit to another and/or removably attach a conduit to a fixture, especially an inlet or exit port to any type of manifold or vessel. Such devices will not be described in detail unless necessary to teach the instant art.

FIG. 1 shows a mobile device for recovery and on site storage of used cooking oil (100) comprising a cooking oil tank (102) having a top (103), sides (109), and a floor (111). Disposed on the top (103) are a cooking oil filter inlet port (144) having walls (147) extending from the top (103) and a removable and replaceable cooking oil filter inlet port cap (146). The top (103) also comprises a cooking oil withdrawal port (140) having a removable and replaceable cooking oil withdrawal port cap (142). In addition, the top (103) also has a means to determine the cooking oil level (128) in the tank (102), in example a dip stick (130). Also located on the top is a cooking oil tank fill port (116).

Attached to a cooking oil tank side (109) is a pump housing (104) having a cooking oil tank fill hose (114) which extends to the cooking oil tank fill port (116) and is removably connected thereto by a fitting (156). Also extending from the pump housing (104) is a cooking oil extraction conduit (110) which is removably connected to an intake wand (118) by a fitting (156) and a handle (105). The intake wand (118) has a handle (120) and is removably held in convenient, inoperative position by a wand holster (126). The intake wand (118) has an inlet (122) which may comprise an intake wand inlet cooking oil filter (124). The device (100) may have conduit brackets (158) to hold the cooking oil extraction conduit (110) in inoperative position.

Extending from a cooking oil tank side (109) is an accessory tray (170).

Figure 17:
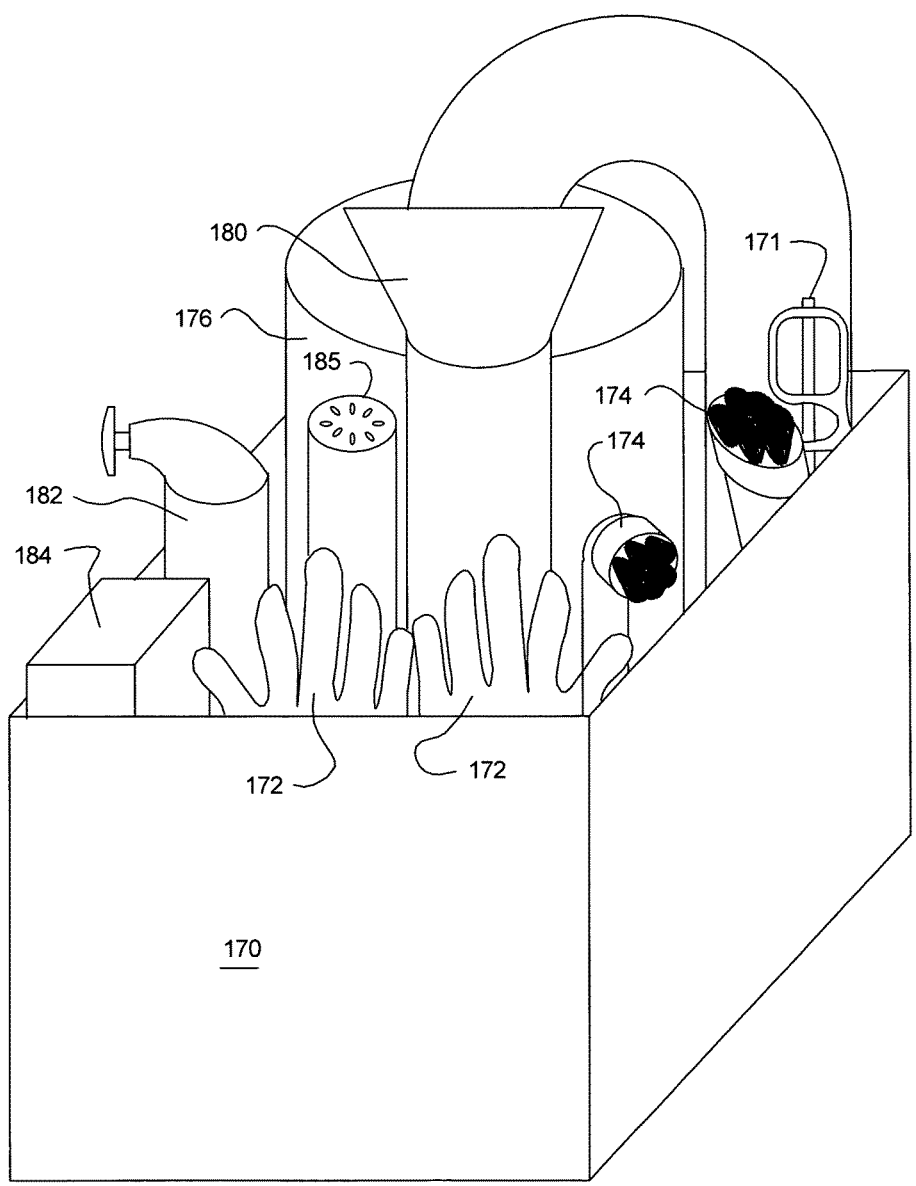
FIG. 17 is a perspective view of elements of the invention.

FIG. 17 shows that the accessory tray (170) may house in accessible disposition such items as a vacuum (176) having an attachment (180) and a hose (178), brushes (174), an eye protection device (171), gloves (172), a powered polisher (182), cleansing pads (184), and cleanser (185), all of whose purposes will be recited presently.

Extending from the tank floor (111) are casters located at optimal positions to allow movement of the device (100) by applying force to a device push/pull handle (164) which extends from cooking oil tank sides (109). The casters (132) may have locking means (138) to prevent unwanted movement of the device (100). The casters (132) may be fixed type (134) as shown in FIG. 2 or a movable or swivelable type (136) as shown in FIG. 2A.

Figure 7:
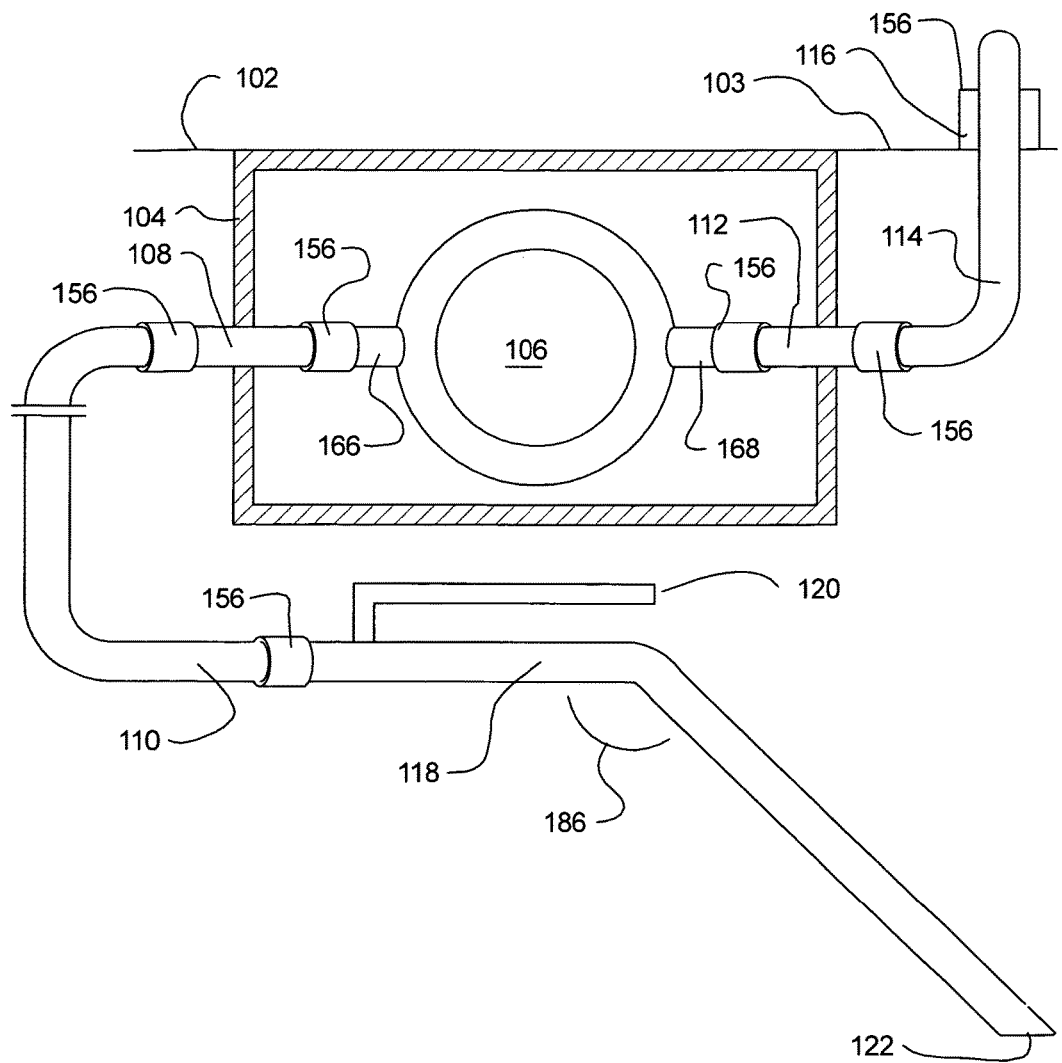
FIG. 7 is a side cross sectional view of elements of the invention.

FIG. 7 shows that the pump housing (104) comprises a pump (106) of any type suitable to move cooking oil (101), though a gear pump is preferred, which may be removably fixed in said housing (104) by any suitable, known means. From the pump (106), extends a pump inlet removably attached by fitting (156) to a pump inlet conduit (108) which extends through the pump housing (104) where it is removably joined by fixture (156) to a cooking oil extraction conduit (110) removably joined to the intake wand (118). Also seen is that a pump outlet (168) extends from the pump (106) and is removably fixed by fitting (156) to a pump outlet conduit (112) which extends through the pump housing (104) where it is removably connected by fitting (156) to a cooking oil tank fill hose (114) which is removably fixed to the cooking oil tank fill port (116) by fitting (156).

Figure 7A:
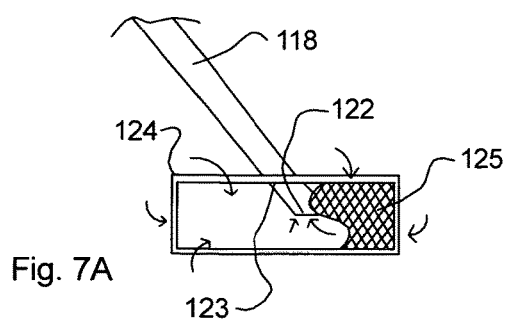
FIG. 7A is a side cross sectional view of elements of the invention.
Figure 7B:
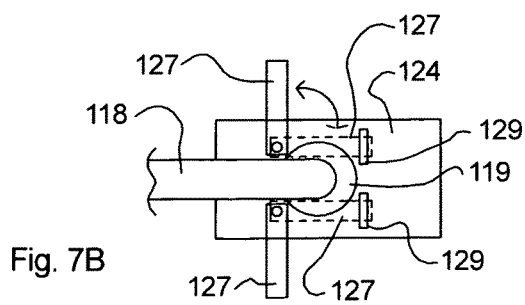
FIG. 7B is a top view of elements of the invention.

FIG. 1, FIG. 7A, and FIG. 7B show that the intake wand (118) may comprise the intake wand inlet cooking oil filter (124) having a sieve portion (125) attached proximal the intake wand inlet (122) with the intake wand (118) extending into the interior of the intake wand inlet cooking oil filter (124) through the intake wand inlet cooking oil filter port (123). Said intake wand inlet cooking oil filter (124) may be attached to the intake wand (118) by any suitable known means. In example, FIG. 7B depicts the intake wand (118) comprising a substantially planar intake wand flange (119) extending from the intake wand (118) so that when the intake wand is extended into the intake wand inlet cooking oil filter (124) through the intake wand inlet cooking oil filter port (123), the intake wand flange will communicate with the intake wand inlet cooking oil filter (124) thusly arresting the insertion of the intake wand (118) and positioning the intake wand inlet (122) within the interior of the intake wand inlet cooking oil filter (124). In addition, the intake wand inlet cooking oil filter (124) may have intake wand inlet cooking oil filter stays (127) positioned on opposite sides of the intake wand (118) inserted into the intake wand inlet cooking oil filter (124). Stay clips are positioned on the intake wand inlet cooking oil filter (124) so that when the intake wand inlet cooking oil filter stays are pivoted, said stays (127) will pass over the intake wand flanges and engage the stay clips (129). The stay clips (129) will hold the intake wand inlet oil filter stays (127) fast thus fixing the intake wand flange (119) between said stays (127) and the intake wand inlet cooking oil filter (124) and attaching the filter (124) to the intake wand (124) in operative disposition. The intake wand inlet cooking oil filter stays are pivotable in opposite directions, as indicated by double headed arrows, and the stay clips (129) are releasable. Therefore, the intake wand inlet cooking oil filter (124) may be attached, removed from, and/or reattached to the intake wand (118).

Figure 16:
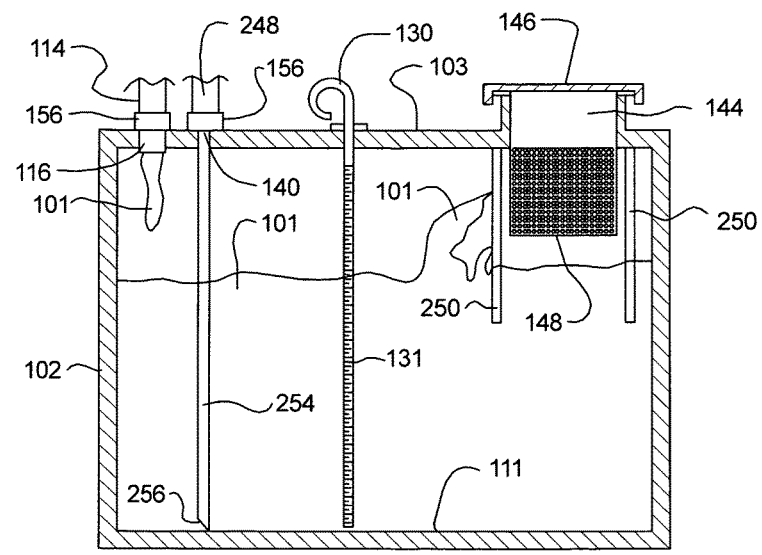
FIG. 16 is a side cross sectional view of elements of the invention.

One skilled in the art will readily appreciate that when the pump (106) is engaged, cooking oil may be taken up through the intake wand inlet (122), after being drawn through the intake wand inlet filter sieve portion (125) and transferred through the intake wand (118), the cooking oil extraction conduit (112), the pump inlet conduit (108), the pump inlet (166), pump (106), pump outlet (168), pump outlet conduit (112), cooking oil tank fill conduit (114), and cooking oil tank fill port (116) and into the cooking oil tank (102) as seen in FIG. 16 where cooking oil (101) is shown entering the cooking oil tank (102) after passing through the cooking oil tank fill port (116). Also appreciated will be that the conduits (110, 108, 112, 114) may be flexible and may comprise food grade hoses.

FIG. 17 shows that the accessory tray (170) may conveniently and/or readily accessibly house various items to facilitate cooking oil recovery and/or fryer cleaning subsequent to cooking oil removal and prior to new cooking oil addition. In example, seen are eye protection device (171), brushes (174), gloves (172), vacuum (176), vacuum hose (178), vacuum hose attachment (180), power polisher (182), cleaning pads (184), cleaning compound (185). Also, we will understand that any other items deemed necessary by one skilled in the art may be disposed in said accessory tray (170).

FIG. 3, FIG. 3A, FIG. 3B, and FIG. 3C show that the cooking oil port filter (148) comprises cooking oil port filter walls (190), a cooking oil port filter floor (192), and a cooking oil port filter aperture (194) oriented opposite the floor (192). Said elements comprise an essentially prismatic configuration and cooking oil port filter flanges (154) extend from cooking oil port filter walls (190) proximal the cooking oil port filter aperture (192). Also noted is that portions of the cooking oil port filter walls (190) and portions of the cooking oil port filter floor (192) comprise cooking oil port filter sieve portions (149).

Figure 4:
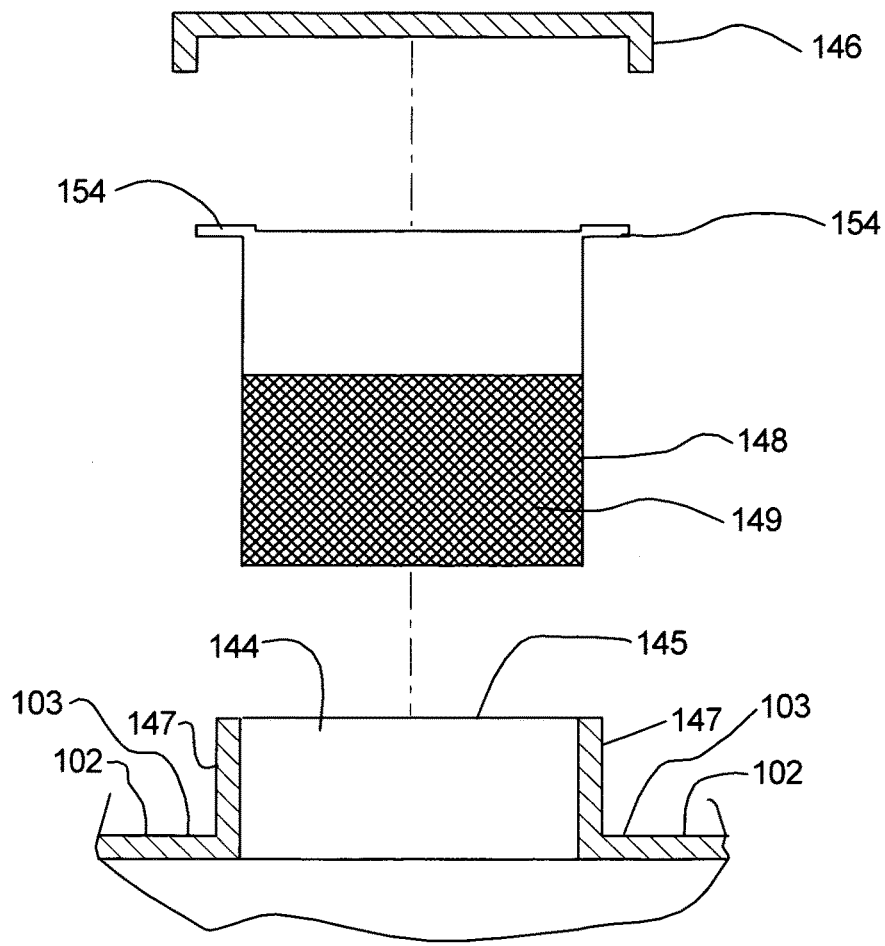
FIG. 4 is an exploded side view of elements of the invention with particular elements shown in cross section.

FIG. 4 shows an exploded view of that portion of the tank (102) and tank top (103) comprising the cooking oil tank inlet filter port (144), the cooking oil inlet port filter (147), and the cooking oil inlet port filter cap (146). Noted is that the cooking oil inlet filter port comprises walls (147) extending upward from the tank (102) and it will be understood that said walls (147) define an aperture (145). Also seen is that the cooking oil port filter (148) is dimensioned to extend with minimum clearance necessary into the cooking oil port filter port (144) through its aperture (145). Also seen is a cooking oil inlet filter port cap (146) dimensioned to communicate with the cooking oil port filter (148) to occlude the cooking oil port filter aperture (145).

Figure 5:
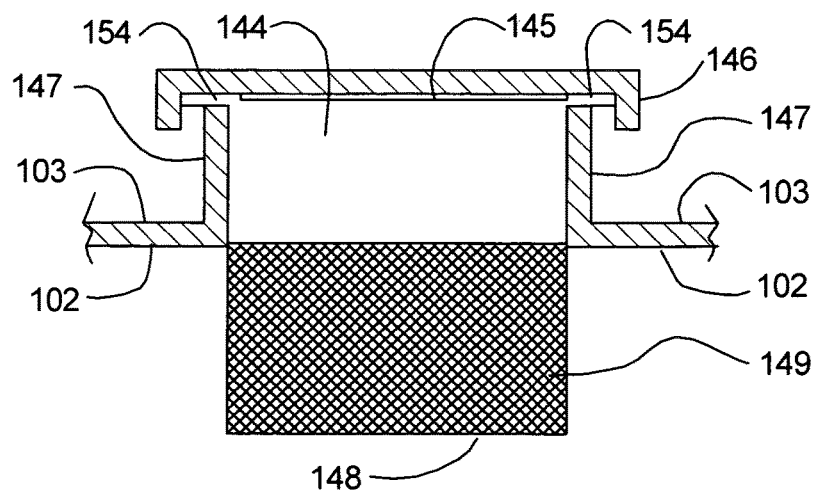
FIG. 5 is a side cross sectional view of the elements shown in FIG. 4 in operative configuration.

FIG. 5 shows that the cooking oil port filter (148) extends into the tank (102) through the cooking oil inlet filter port (144) whereupon the cooking oil port filter flanges (154) will rest upon cooking oil inlet filter port walls (147) thusly arresting progress of the cooking oil port filter (148) into the cooking oil inlet filter port (144) thusly fixing the cooking oil port filter (148) in operative position. Additionally shown is that the cooking oil inlet filter port cap (146) will rest with minimum clearance upon the cooking oil port filter flanges (154) and the cooking oil port filter walls (190).

Figure 8:
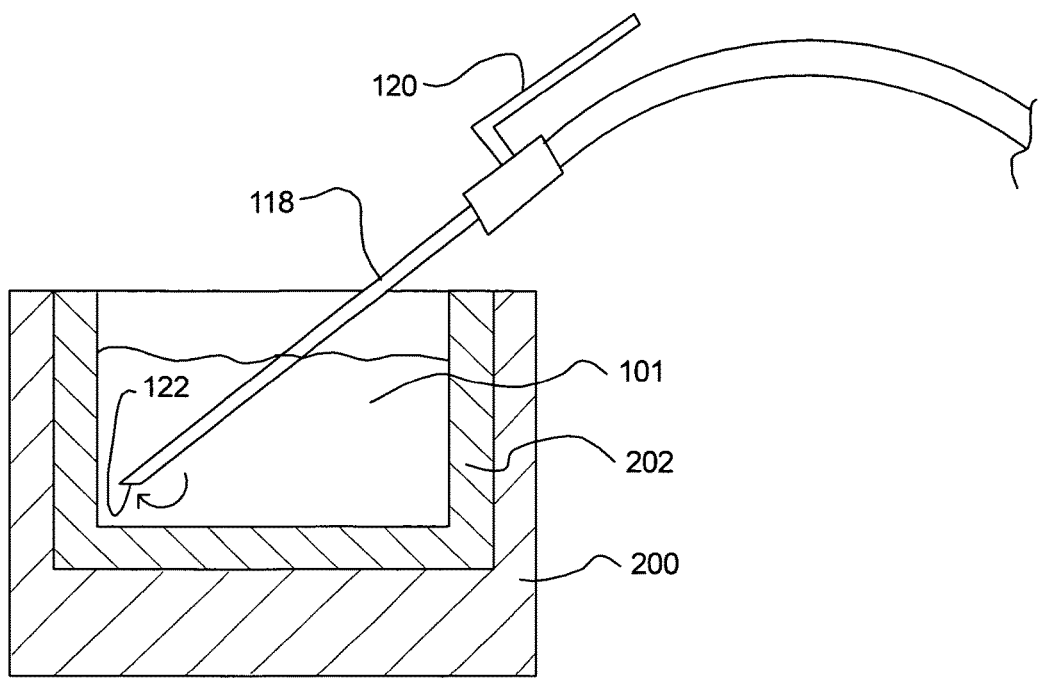
FIG. 8 is a side view of elements of the invention with associated device shown in cross section.

In consideration of FIG. 1, FIG. 7, and FIG. 8, employment of the device (100) in an embodiment may be described. The device (100) is moved from its place of stowage, after disengaging the caster locks (132), to a position proximal a cooking oil fryer (200) having cooking oil vats (202) so that the length of the cooking oil extraction conduit (110) allows functional use of the intake wand (118). The caster locks (132) may then be re-engaged if deemed necessary for convenience and/or safety. The intake wand (118) is then removed from the wand holster (126) and the cooking oil extraction conduit (110) is disengaged as necessary from brackets (158) whereupon the intake wand (118) is positioned, by usage of the handle (120) if needed, into the fryer vat (202) below the level of cooking oil (101). The pump (106) is then engaged and cooking oil (101) is drawn into the intake wand (118) through intake wand inlet (122). The cooking oil (101) then passes through the intake wand (118) into and through the cooking oil extraction conduit (110), into and through the pump inlet conduit (108), into and through the pump inlet (166), into and through the pump (106) into and through the pump outlet (168), into and through the pump outlet conduit (112), into and through the cooking oil tank fill conduit (114), into and through the cooking oil tank fill port (116), and into the tank (102) as is seen in FIG. 20.

As previously shown, a cooking oil filtration device may be disposed between the cooking oil (101) in fryer vat (202) and the cooking oil (101) in the tank (102) so that potentially deleterious particulate matter is removed from cooking oil (101) and thusly prevented from entering the tank (102), in example between the cooking oil (101) and the intake wand inlet (122) as seen if FIG. 1, FIG. 7A, and FIG. 7B.

Figure 8A:
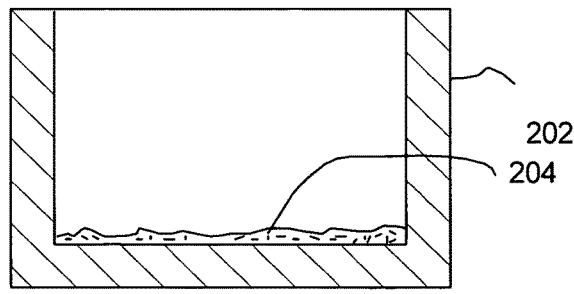
FIG. 8A is a side cross sectional view of associated element.

In the above described exploitation of the device (100), after all possible cooking oil (101) has been removed from the fryer vat (202), there will remain a residue (204) in the bottom of said vat (202) primarily comprising charred organic matter that flaked off food items previously prepared in the fryer vat (202), as seen in FIG. 8A. Said residue (204) should be removed prior to recharging the fryer vat (202) with fresh cooking oil to prevent any number of undesirable effects well known in the art. To do so, implements in the accessory tray (170) may be used in manners known by one skilled in the art to remove said residue (204) and leave the fryer vat (202) in essentially pristine condition. Though particular items are depicted in FIG. 17, said depiction is not intended to limit the contents of said accessory tray (170). Other items deemed useful by one skilled in the art may comprise said accessory tray (170) contents.

Figure 8B:
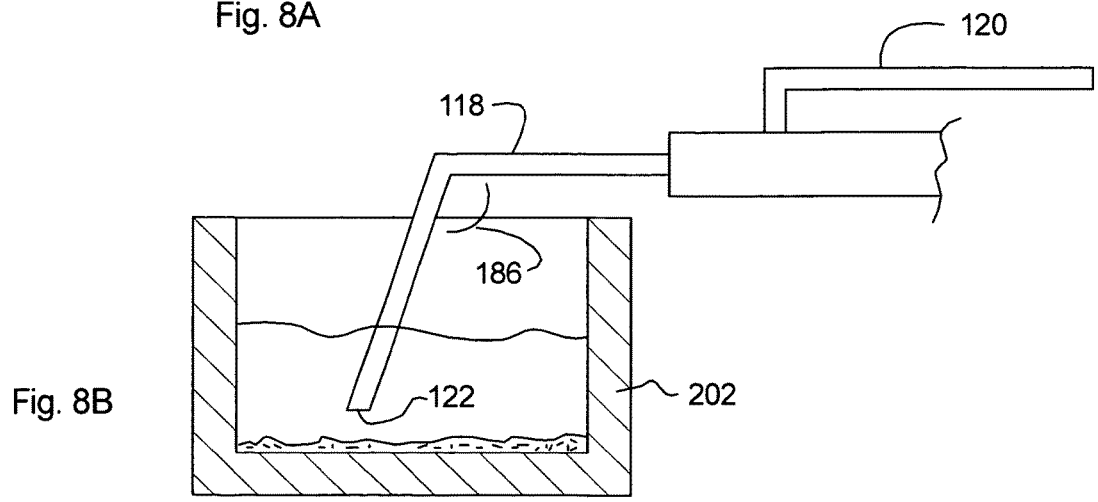
FIG. 8B is a side view of elements of the invention with associated device shown in cross section.

FIG. 8 and FIG. 8B show a fryer (200) having a vat (202) comprising cooking oil (101). The intake wand is introduced into the vat (202) so that the intake wand inlet (122) is below the surface of the cooking oil (101) whereupon the cooking oil (101) is withdrawn as previously described. It will be understood that the intake wand (118) may be manually manipulated to place it in optimal operative orientation by grasping the handle (120). Also, the intake wand (118) may comprise a configuration to facilitate said positioning of the intake wand (118) in operative disposition, in example, but not limited to, the intake wand angle (186) seen in FIG. 8B.

After cooking oil (101) is removed from the fryer (200), the pump (106) is disengaged, the intake wand may be returned to the wand holster, the cooking oil tank fill conduit (114) may be secured in storable orientation with the conduit brackets (158), the caster locks (138) may be disengaged, and the device (100) moved to its stowed location where the caster locks (138) may be re-engaged.

Known in the art are fat fryers (200) which have integral used cooking oil (101) removal means. There are those with drains which when opened, will allow used cooking oil to flow out by means of gravity into a collection vessel (210). There are those comprising pumps which will remove the used cooking oil from the fryer (200) and into conduits, in example, a fryer extraction hose (212) which will transfer the cooking oil (101) to a collection vessel. In such instances, the instant art need not comprise its own cooking oil removal means such as the previously recited embodiment comprising intake wand, pump, and appurtenant conduits.

Figure 6:
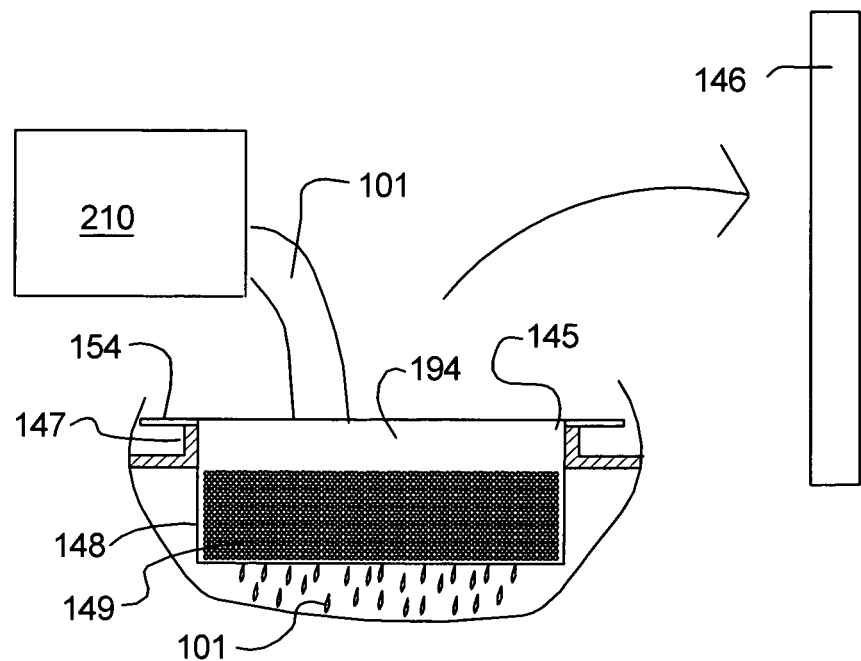
FIG. 6 is a side cross sectional view of elements of the invention in operative disposition.
Figure 6A:
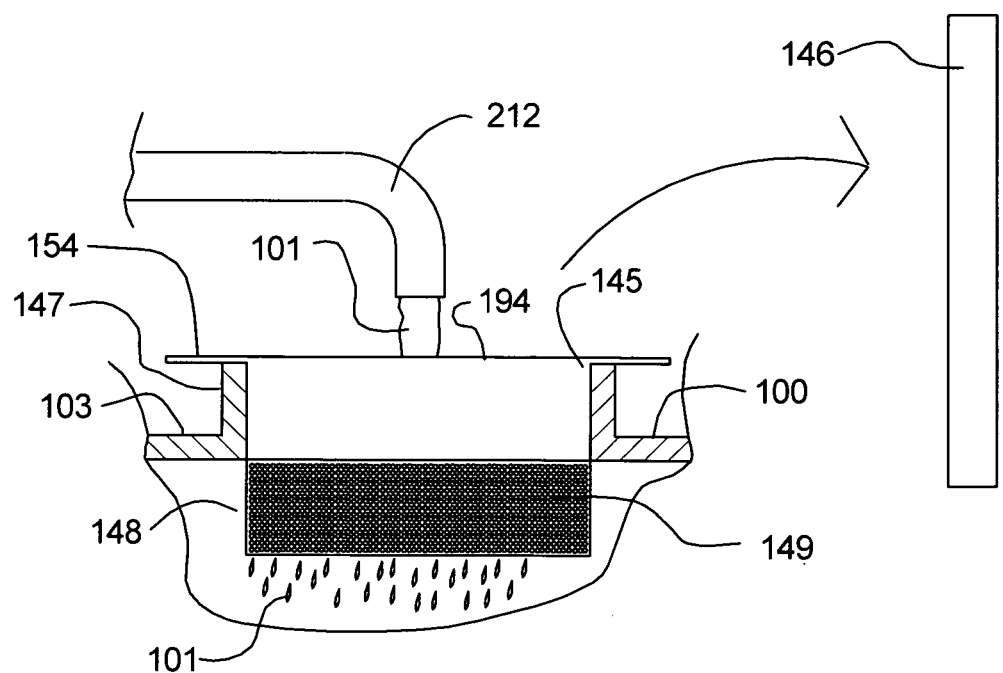
FIG. 6A is a side cross sectional view of elements of the invention in operative disposition.

Alternatively, as shown in FIG. 6 and FIG. 6A, the cooking oil inlet filter port cap (146) may be removed allowing cooking oil (101) to be introduced into the cooking oil port filter (148). Said introduction may be accomplished by pouring cooking oil (101) out of the vessel (210) into which it was previously drained or pumped and into said cooking oil port filter (148) as in FIG. 6. Said introduction may also be affected by directing the output from the fryer extraction hose (212) communicating with the aforementioned removal pump integral to the fryer (200) into the cooking oil port filter (148) as shown in FIG. 6A.

It will be readily appreciated that once cooking oil (101) is deposited in the cooking oil port filter (148) said cooking oil will pass through the filter (148), in example by gravity, as in FIG. 6 and FIG. 6A, and into the cooking oil tank (102) where it is stored.

As previously recited, the cooking oil port filter (148) is removable from the cooking oil inlet filter port. This may be accomplished by grasping or hooking a finger or fingers under the cooking oil port filter flanges (154) and lifting out the cooking oil port filter (148). This allows for cleaning said filter (148) after usage whereupon it may be replaced by means of the same flanges (154).

Figure 14:
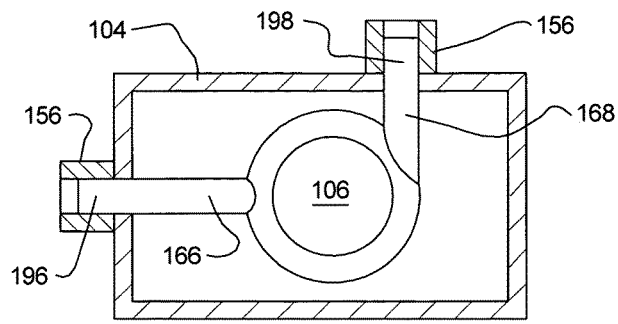
FIG. 14 is a side view of elements of the invention.
Figure 14A:
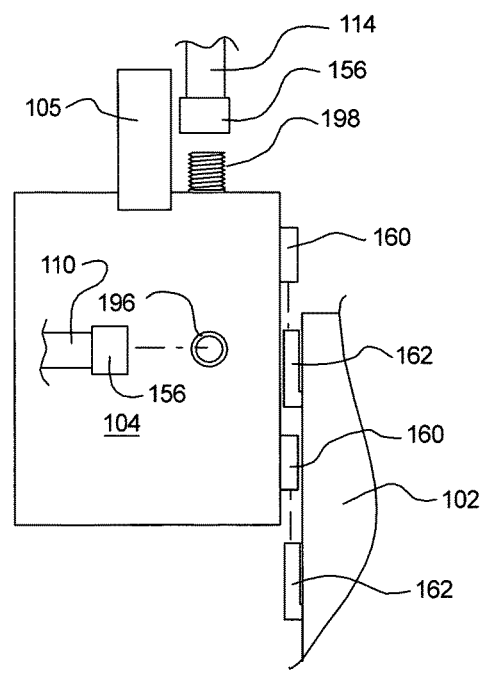
FIG. 14A is a side view of elements of the invention.
Figure 15:
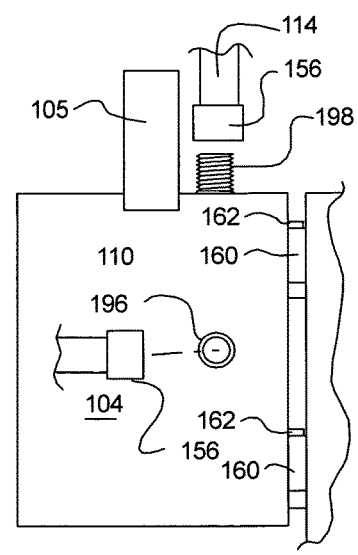
FIG. 15 is a side view of the elements of the invention shown in FIG. 14.

FIG. 14A and FIG. 15 show that by means of fitting (156), the cooking oil tank fill conduit (114) may be disengaged from the pump outlet conduit (112). Also seen is that the tank (102) may comprise tank hooks (162) and that the pump housing (104) may comprise pump housing brackets (160). Additionally noted is that the pump housing brackets (160) and the tank hooks (162) are configured to communicate so that the pump housing (104) and the tank (102) may be removably attached. Therefore, one skilled in the art will understand that the pump housing (104) comprising the pump (106) may be removed from the tank (102) allowing the instant art (100) to be exploited in an embodiment not having a pump. Likewise, by reversing the above procedures, the pump housing (104) comprising a pump (105) and the cooking oil tank fill conduit (114) may be reattached to the tank (102) in operative disposition.

Further shown by FIGS. 14A and 15 is that for convenience and/or ease of manipulation, the cooking oil extraction conduit (110) may be disengaged from the pump inlet conduit (108) so that the pump housing (104) and the cooking oil extraction conduit (110) and communicating elements may be handled separately. Additionally understood is that the manipulation of the pump housing (104) may be facilitated by use of the handle (105).

FIG. 14 shows that the pump inlet (166) may extend from the pump (106) to a pump inlet end (196) disposed outside the pump housing (104) where it may communicate with fitting (156) therefore the pump inlet conduit (108) may be eliminated. Also shown is that the pump outlet (168) may extend from the pump (106) to a pump outlet end (198) disposed outside the pump housing (104) where it may communicate with fitting (156) therefore the pump outlet conduit (112) may be eliminated.

FIG. 16 shows that the instant art (100) may comprise a tank evacuation cannula (254) having a cannula intake (256) extending from the cooking oil withdrawal port (140) toward the cooking oil tank floor (111) a distance sufficient to allow extraction of maximum quantity of cooking oil through said intake (256). Also noted is that a tank evacuation conduit (248) may be removably attached to the cooking oil withdrawal port (140) and/or the tank evacuation cannula (254) by fitting (156). Also seen is that the cannula intake (256) may comprise a configuration to facilitate optimum cooking oil (101) intake, in example, the oblique disposition of said cannula intake (256) to the tank floor (111).

Figure 16A:
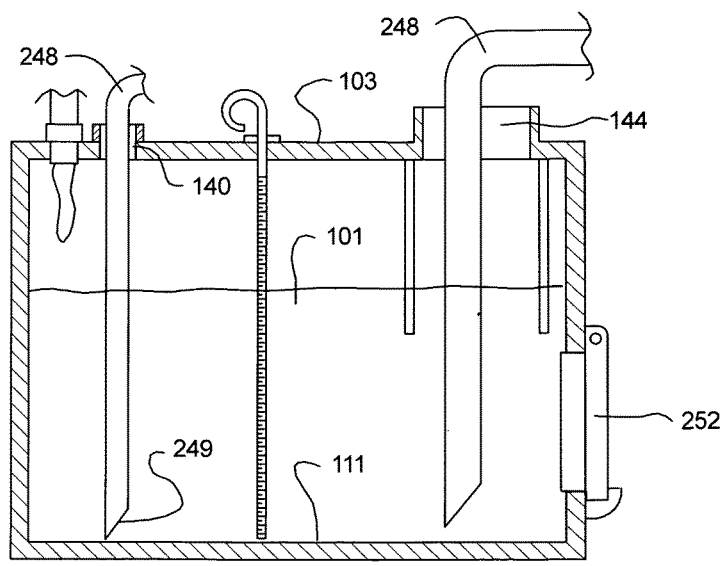
FIG. 16A is a side cross sectional view of elements of the invention.

FIG. 16A shows that the cooking oil withdrawal port (140) may allow insertion therethrough of the tank evacuation conduit (248) having an intake (249) to a distance sufficiently proximal the tank floor (111) to allow withdrawal of the maximum volume of cooking oil (101). Also seen is that the tank evacuation conduit intake (249) may comprise a configuration to facilitate optimum cooking oil (101) intake, in example the oblique disposition of said tank evacuation conduit intake (249) to the tank floor (111).

FIG. 16 shows that the dip stick (130) may comprise graduations (131) to facilitate cooking oil (101) level and/or volume within the tank (102).

FIG. 16 shows that baffles (250) may be disposed, in example extending from the tank top (103) as shown in FIG. 16), proximal the cooking oil port filter (148) to prevent contact with said filter (148) by cooking oil (101) in the tank (102) that may be agitated and/or caused to comprise waves by movement of the tank (102).

Now, one skilled in the art will readily appreciate that the tank evacuation conduit (248) may communicate with a means to affect passage of cooking oil (101) therethrough, in example a pump, and may further communicate with a storage and/or transfer means, in example a tank truck, said devices not integral to or permanently contiguous with any institution comprising fat fryers. Therefore, the instant device (100) need not have means of withdrawing cooking oil from the tank (102).

FIG. 16A shows that the tank (102) may comprise a tank access maintenance port (252) to allow cleaning of the tank interior or maintenance or replacement of items located within said tank.

FIG. 9, FIG. 9A, FIG. 9B, and FIG. 9C show an essentially prismatic cooking oil port filter frame (214) having substantially planar strips (226) which comprise cross members (222) and essentially upright members (224) which communicate at corners (230). The cooking oil port filter frame (214) comprises ends (234) having filter apertures (228), sides (232) having filter apertures (228), a bottom (236) having a filter aperture (228). Opposite the cooking oil port filter frame bottom (236) is a cooking oil port filter frame top (238) having an aperture (239). Also seen are cooking oil port filter frame brackets (218) extending essentially normal to the strips (226) and having elements essentially parallel to said strips (226). Also seen is that a cooking oil port filter frame end (238) comprises a slot (220).

FIG. 10 shows a filter bottom panel (240) having a sieve portion (246). Now it will be understood that the filter bottom panel (240) may be inserted through the cooking oil port filter frame slot (220) to the extent that it abuts the cross member (222) comprising the strip (226) as shown in FIG. 11. Also noted is that the filter panel sieve portion (246) is essentially equal in area to filter aperture (228) and occludes said aperture (228).

FIG. 10A shows a filter end panel (244) having a sieve portion (246). Also seen is the cooking oil port filter frame end (234) with the filter bottom panel (240) inserted to maximum extent through cooking oil port filter frame slot (220).

FIG. 11 shows that the filter end panel (244) may be inserted through cooking oil port filter frame brackets (218) where it abuts the filter bottom panel (240). Also noted is that the filter panel sieve portion (246) is essentially equal in area to filter aperture (228) and occludes said aperture (228).

Figure 12:
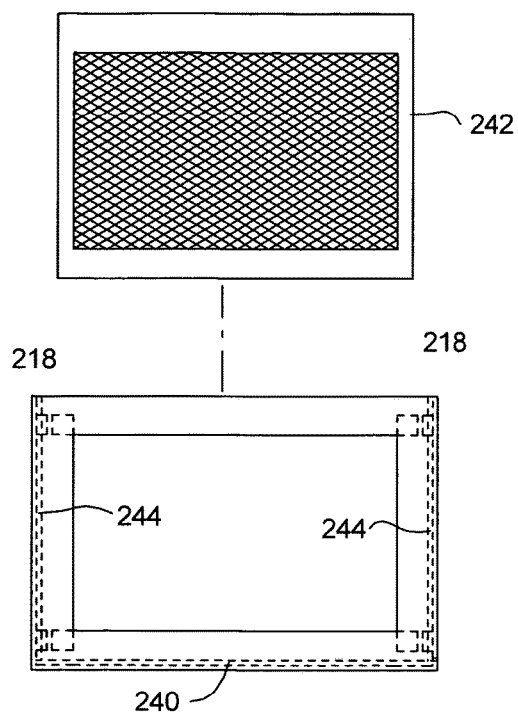
FIG. 12 is an exploded side view of elements of the invention.

FIG. 12 shows a filter side panel (242) having a sieve portion (246) and a cooking oil port filter frame side (232) having brackets (218) and a filter aperture (228).

Figure 13A:
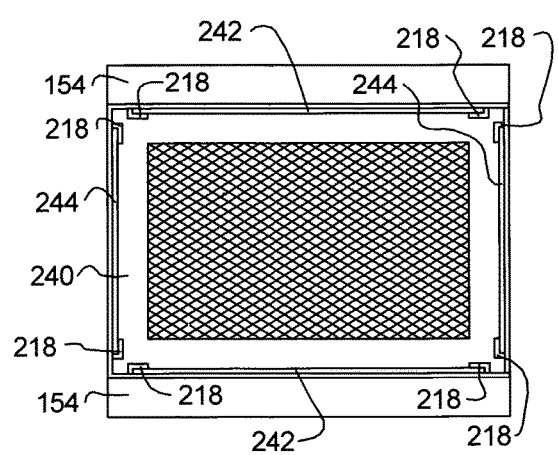
FIG. 13A is a top view of elements of the invention.
Figure 13:
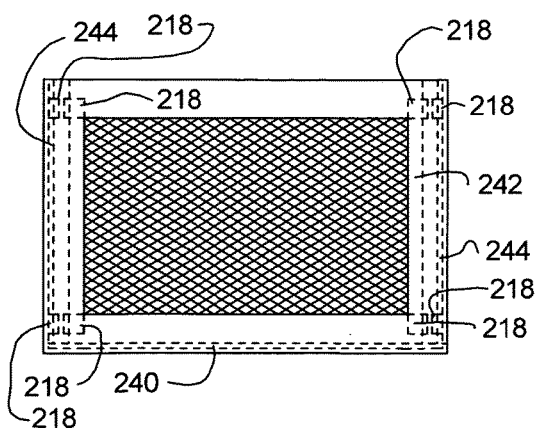
FIG. 13 is a side view of elements of the elements of the invention shown in FIG. 12.

FIG. 13 shows that the filter side panel (242) may be inserted through brackets (218) and that the area of the sieve portion (246) and the area of the aperture 228) are substantially equal and that said sieve portion (246) occludes the aperture (228).

Figure 13B:
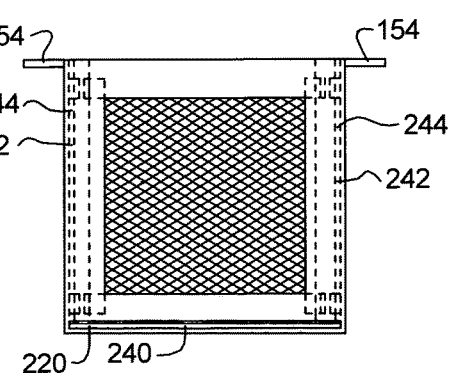
FIG. 13B is a front view of elements of the invention.

FIG. 13A and FIG. 13B show the filter bottom panel (240) inserted through the cooking oil port filter frame slot (220) to maximum extent as previously described. Also shown are the filter side panels (242) inserted through brackets (218) and thusly fixed essentially against the cooking oil port filter frame sides (232). Additionally shown are the filter end panels (244) inserted through brackets (218) and thusly fixed essentially against the cooking oil port filter frame ends (234).

FIG. 13 and FIG. 13B also show the cooking oil port filter flanges (154) as previously described.

Now, one skilled in the art will readily appreciate that the cooking oil port filter frame (214) as previously recited in combination with the filter bottom panel (240), the filter side panels (242), and the filter end panels (244) may function after the fashion of the previously taught cooking oil port filter (148).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An oil transport device employable for recovery and on site storage of used cooking oil comprising:
    a tank including a plurality of casters and a tank top, said tank having:
        a tank interior,
        an oil tank fill port open to the tank interior,
        an oil level determination means extending into the tank interior,
        an oil withdrawal port open to the tank interior,
        one or more oil inlet filter port walls extending upwardly from the tank top, the one or more oil inlet filter port walls defining an oil inlet filter port aperture open to the tank interior, and
        an oil inlet port filter positionable in the oil inlet filter port aperture, the oil inlet port filter shaped to rest on the one or more oil inlet filter port walls,
    a handle mounted to the tank and extending upwardly from the tank;
    a pump comprising a housing affixed to the tank;
    an intake wand having an inlet;
    an intake wand holster mounted to the tank;
    an oil extraction conduit connected between the intake wand and the pump; and
    an oil tank fill conduit connected between the pump and the oil tank fill port;
    wherein the pump selectively draws oil through the intake wand and pumps the oil into the tank interior through the oil tank fill port.

2. The device as in claim 1, wherein the pump housing is removably affixed to the tank.

3. The device as in claim 1, wherein the oil extraction conduit is removably connected between the intake wand and the pump.

4. The device as in claim 1, wherein the oil tank fill conduit is removably connected between the pump and the oil tank fill port.

5. The device as in claim 1, wherein the oil inlet filter port aperture includes a removable oil inlet filter port cap that can occlude the oil inlet filter port aperture and the oil inlet port filter.

6. The device as in claim 1; wherein the oil withdrawal port includes a removable cap.

7. The device as in claim 1, wherein the plurality of casters are selectively lockable against movement.

8. The device as in claim 1, wherein the oil inlet port filter is removably insertable into the oil inlet filter port aperture.

9. The device as in claim 1, wherein the inlet of the intake wand includes an intake wand inlet filter.

10. A mobile device for recovery and on site storage of used cooking oil comprising:
    a tank that is transferrable from one location to another, said tank having:
        a tank interior;
        an oil tank fill port open to the tank interior;
        an oil withdrawal port open to the tank interior,
        an oil inlet filter port aperture open to the tank interior, and
        an oil inlet port filter positionable in the oil inlet filter port aperture,
    a handle mounted to the tank, the handle extending upwardly from the tank;
    a pump in communication with the oil tank fill port;
    an intake wand in communication with the pump; and
    an intake wand holster mounted to the tank;
    wherein the pump selectively draws oil through the intake wand and pumps the oil into the tank interior through the oil tank fill port.

11. The device as in claim 10, wherein the tank further comprises a plurality of lockable casters.

12. The device as in claim 10, wherein:
    the oil inlet port filter is removably insertable into the oil inlet filter port aperture,
    the tank further comprises a removable cap positionable over the oil inlet filter port aperture and the oil inlet port filter.

13. A mobile device employable for recovery and on site storage of used cooking oil comprising:
    a tank including a plurality of lockable casters; said tank comprising:
        a tank interior;

an oil tank fill port open to the tank interior,
an oil withdrawal port open to the tank interior,
an oil inlet filter port aperture open to the tank interior,
an oil inlet port filter positionable in the oil inlet filter port aperture, and a removable oil inlet filter port cap positionable over the oil inlet filter port aperture,
a handle mounted to the tank, the handle extending upwardly from the tank;
an intake wand having an inlet, the intake wand including a handle;
an intake wand holster mounted to the tank;
a pump comprising a housing removably affixed to the tank;
an oil extraction conduit removably connected between the intake wand and the pump; and
an oil tank fill conduit removably connected between the pump and the oil inlet;
wherein the pump selectively draws oil through the intake wand and pumps the oil into the tank interior through the oil tank fill port.

14. The device as in claim 13, wherein the oil extraction conduit is removably connected to the intake wand and removably connected to the pump.

15. The device as in claim 13, wherein the oil tank fill conduit is removably connected to the oil tank fill port and removably connected to the pump.

16. The device as in claim 13, wherein the oil tank fill port further comprises a removable cap.

17. The device as in claim 13, further comprising an intake wand inlet filter disposed on the intake wand inlet.

18. The device as in claim 13, wherein:
the oil extraction conduit includes multiple oil extraction conduit sections removably connected between the intake wand and the pump; and
the oil tank fill conduit includes multiple oil tank fill conduit sections removably connected between the pump and the oil tank fill port.

* * * * *